United States Patent
Sarkkinen (10) Patent No.: US 7,852,911 B2
(45) Date of Patent: Dec. 14, 2010

(54) METHOD AND ARRANGEMENT FOR CHANNEL SIMULATION

(75) Inventor: Timo Sarkkinen, Kempele (FI)

(73) Assignee: Elektrobit System Test Oy, Oulunsalo (FI)

( * ) Notice: Subject to any disclaimer, the term of this patent is extended or adjusted under 35 U.S.C. 154(b) by 313 days.

(21) Appl. No.: 11/266,599

(22) Filed: Nov. 3, 2005

(65) Prior Publication Data

US 2006/0088084 A1    Apr. 27, 2006

Related U.S. Application Data

(63) Continuation of application No. PCT/FI2004/000294, filed on May 14, 2004.

(30) Foreign Application Priority Data

May 15, 2003    (FI) ................................. 20030727

(51) Int. Cl.
H04B 3/46    (2006.01)
H04L 25/49    (2006.01)

(52) U.S. Cl. ........................ 375/224; 375/295; 375/296; 375/254

(58) Field of Classification Search ................. 375/224, 375/220, 285, 293, 296, 295, 346, 354, 355
See application file for complete search history.

(56) References Cited

U.S. PATENT DOCUMENTS

| | | | |
|---|---|---|---|
| 3,087,827 A | 4/1963 | Klenke, Jr. et al. | |
| 3,087,828 A | 4/1963 | Linton | |
| 3,087,829 A | 4/1963 | Linton | |
| 4,380,618 A | 4/1983 | Khan et al. | |
| 4,743,658 A | 5/1988 | Imbalzano et al. | |
| 4,823,456 A | 4/1989 | Gray | |
| 5,689,525 A * | 11/1997 | Takeishi et al. | 375/141 |
| 5,932,673 A | 8/1999 | Aten et al. | |
| 5,972,494 A | 10/1999 | Janssens | |
| 6,137,847 A * | 10/2000 | Stott et al. | 375/344 |
| 6,232,372 B1 | 5/2001 | Brothers et al. | |
| 6,258,404 B1 * | 7/2001 | Morgand et al. | 427/163.2 |
| 6,269,060 B1 * | 7/2001 | Harvey et al. | 369/47.28 |
| 6,285,404 B1 * | 9/2001 | Frank | 348/469 |

(Continued)

FOREIGN PATENT DOCUMENTS

JP    11145917    5/1999

(Continued)

*Primary Examiner*—David C Payne
*Assistant Examiner*—Linda Wong
(74) *Attorney, Agent, or Firm*—Hoffmann & Baron, LLP (57) ABSTRACT

A method and arrangement for simulating a radio channel. In the solution, a channel having paths is simulated and the delay of each path is formed separately with a low-resolution delay arrangement and a high-resolution delay arrangement in such a manner that the simulated delay of each path is the sum of the low-resolution delay and the high-resolution delay. Low-resolution delaying is performed on each path discontinuously as multiples of a predefined minimum delay. For each signal delayed by a low-resolution delay, at least one fixed, high-resolution delay is selected, which is a predefined part of the predefined minimum delay of a the low-resolution delay. Each signal delayed by a low-resolution delay is delayed by at least one selected high-resolution delay to form a path-specific total delay.

18 Claims, 4 Drawing Sheets

U.S. PATENT DOCUMENTS

| | | | |
|---|---|---|---|
| 6,445,231 B1 * | 9/2002 | Baker et al. | 327/158 |
| 6,518,349 B1 | 2/2003 | Felix et al. | |
| 6,774,690 B2 * | 8/2004 | Baker et al. | 327/158 |
| 6,925,108 B1 * | 8/2005 | Miller et al. | 375/150 |
| 7,197,063 B2 * | 3/2007 | Reial et al. | 375/142 |
| 2002/0039041 A1 * | 4/2002 | Gardei et al. | 327/276 |
| 2002/0126748 A1 * | 9/2002 | Rafie et al. | 375/229 |
| 2002/0178391 A1 * | 11/2002 | Kushnick | 713/500 |
| 2004/0071249 A1 * | 4/2004 | Schell | 375/371 |
| 2004/0141067 A1 * | 7/2004 | Nakayama et al. | 348/222.1 |
| 2004/0203405 A1 * | 10/2004 | Reial et al. | 455/65 |
| 2005/0239448 A1 | 10/2005 | Bayne | |
| 2005/0239495 A1 | 10/2005 | Bayne | |
| 2008/0164920 A1 * | 7/2008 | Cho | 327/158 |
| 2010/0090735 A1 * | 4/2010 | Cho | 327/158 |

FOREIGN PATENT DOCUMENTS

| | | |
|---|---|---|
| WO | WO 93/20626 | 10/1993 |
| WO | WO 99/21305 | 4/1999 |
| WO | WO 02/41538 A1 | 5/2002 |
| WO | WO 2005/101863 A2 | 10/2005 |

* cited by examiner

METHOD AND ARRANGEMENT FOR CHANNEL SIMULATION

CROSS-REFERENCE TO RELATED APPLICATION

This application is a continuation of International Application PCT/FI2004/000294, filed May 14, 2004, which designated the U.S. and was published under PCT Article 21 (2) in English, and claims priority to Finnish Application No. 20030727, filed May 15, 2003, both of which are incorporated by reference herein.

FIELD OF THE INVENTION

The invention relates to a method and arrangement for forming a delay and a channel simulator that endeavour to simulate the propagation of a radio-frequency signal along one or more paths from a transmitter to a receiver.

BRIEF DESCRIPTION OF THE RELATED ART

When a radio-frequency signal is transmitted from a transmitter to a receiver, the signal propagates in a radio channel along one or more paths, in each of which the phase and amplitude of the signal vary, which causes fades of different magnitudes in length and strength to the signal. Noise and interference caused by other transmitters also disturb the radio link.

The transmitter and receiver can be tested either under actual conditions or using a radio channel simulator that simulates the actual conditions. Tests conducted in actual conditions are difficult, because tests taking place outdoors, for instance, are affected by uncontrollable phenomena, such as the weather and season, that change all the time. In addition, a test conducted in one environment (city A) does not fully apply to a second corresponding environment (city B). It is also usually not possible to test the worst possible situation under actual conditions.

However, with a device simulating a radio channel, it is possible to very freely simulate a desired type of radio channel. In a digital radio-channel simulator, the channel is usually modelled with a FIR (Finite Impulse Response) filter that forms a convolution between the channel model and the input signal in such a manner that the signal that is delayed by different delays is weighted by channel coefficients, i.e. tap coefficients, and the weighted signal components are summed. The channel coefficients are altered to correspond to the behaviour of an actual channel.

With current component technology, it is not possible to manufacture a real-time, precise and wideband simulator that simulates the behaviour of a wideband signal both quickly and precisely. Calculation caused by the multiplication by channel coefficients and the summing of delayed signals increases strongly as a function of the number of delay elements in the FIR filter. Covering a long delay area with a large number of delay elements is thus not possible, because, in the end, the calculation becomes impossible to perform fast enough. With the FIR filter, it is also difficult to provide a delay that is not a multiple of the used delay unit. Therefore, the delay is divided into a low-resolution delay and a high-resolution delay that are formed specifically for each path.

However, dividing the delay poses problems. Forming high- and low-resolution delays separately for each path uses up a great deal of system resources and capacity. In addition, the fact that low-resolution delays are variable adds to the consumption of resources. This decreases the accuracy of the simulation and slows it down.

SUMMARY OF THE INVENTION

It is an object of the invention to provide an improved solution for forming a delay. This is achieved by a method for performing radio channel simulation, the method comprising simulating a channel having at least one path; and forming the delay of each path separately with a low-resolution delay and a high-resolution delay in such a manner that the simulated delay of each path is the sum of the low-resolution delay and the high-resolution delay; performing low-resolution delaying on each path discontinuously as multiples of a predefined minimum delay; and performing high-resolution delaying more precisely than the low-resolution delaying. The method further comprises selecting for each signal delayed by a low-resolution delay at least one fixed, high-resolution delay which is a predefined part of the predefined minimum delay of the low-resolution delay; and delaying each signal delayed by a low-resolution delay by the at least one selected high-resolution delay.

Another object of the invention is an arrangement for performing radio channel simulation, which arrangement is arranged to simulate a channel having at least one path and in which arrangement the delay of each path is formed separately with a low-resolution delay and a high-resolution delay in such a manner that the simulated delay of each path is the sum of the low-resolution delay and the high-resolution delay, the arrangement comprising: one low-resolution delay unit on each path, each low-resolution delay unit performing low-resolution delaying on each path discontinuously as multiples of a predefined minimum delay, and a high-resolution delay arrangement performing the delaying more precisely than the low-resolution delaying. Further, the high-resolution delay arrangement is arranged to provide at least one fixed, high-resolution delay which is a predefined part of the predefined minimum delay of the low-resolution delay, and the high-resolution delay arrangement is arranged to select for each signal delayed by a low-resolution delay at least one predefined high-resolution delay.

Preferred embodiments of the invention are described in the dependent claims.

The invention is based on the idea that when delaying multipath-propagated signals separately with low resolution and high resolution, at least one fixed, high-resolution delay is selected among the high-resolution delays for the signal of each path.

The method and arrangement of the invention provide several advantages. When delaying a signal separately with low-resolution delays and high-resolution delays, the high-resolution delays are not fixedly path-specific, but only the length of the delay is fixed, which reduces the use of resources, because delays can be divided with the signals of different paths.

BRIEF DESCRIPTION OF THE DRAWINGS

The invention will now be described in greater detail by means of preferred embodiments and with reference to the attached drawings, in which.

DETAILED DESCRIPTION OF THE PREFERRED EMBODIMENTS

The present solution is suitable for use in the channel simulation of a radio-frequency signal (RF signal). Examples of suitable applications include different wireless mobile systems, without being limited thereto, however.

Figure 1:
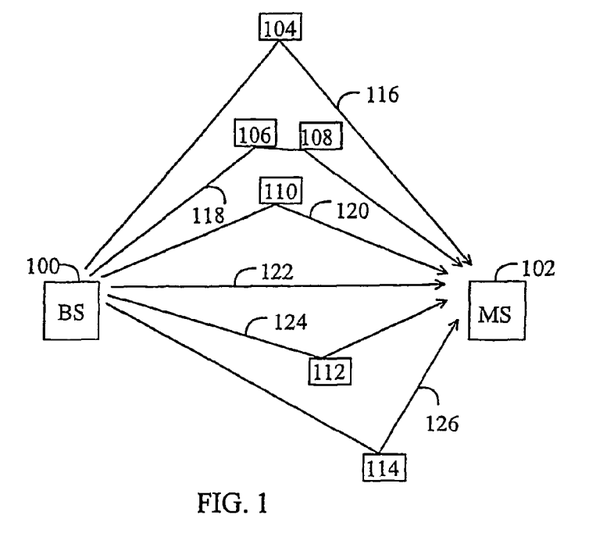
FIG. 1 shows the multipath-propagation of a signal in a radio system.

Let us first examine FIG. 1 that describes a simple transmission and reception situation in a mobile system. A transmitter 100, which can be a base station, for instance, transmits a radio-frequency signal to a receiver, which can be a terminal 102, such as mobile phone, of the mobile system. The terminal 102 receives a signal that has multipath-propagated along paths 116 to 126. The signal can be reflected and scatter several times on different paths, which causes propagation delay differences between the multipath-propagated signal components. On path 116, the signal interacts with object 104; on path 118, the signal interacts with objects 106 and 108; on path 120, the signal interacts with object 110; on path 124, the signal interacts with object 112; and on path 126, the signal interacts with object 114. When propagating along path 122, the signal proceeds along a direct visual contact to the receiver without reflection. Objects 104 to 114 may be buildings, terrain objects (mountains, rocks, forests, etc.) or the like. FIG. 1 shows six paths, but, in reality, there may be more or fewer paths.

Figure 2:
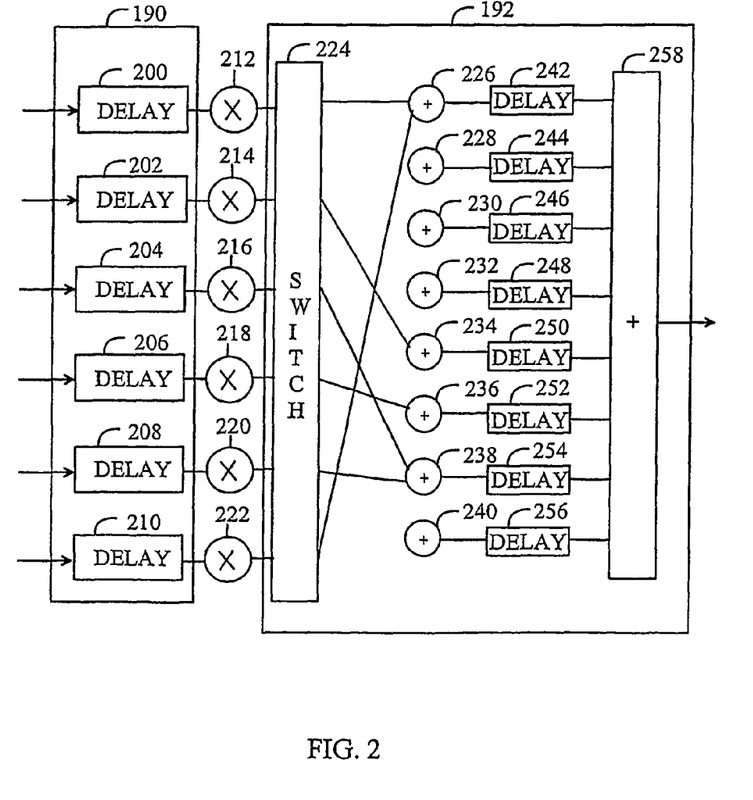
FIG. 2 shows an arrangement for forming a delay.

FIG. 2 shows a block chart of the present solution, with which it is possible to simulate a six-path channel. Generally, there may be more or fewer paths, but the principle is, however, as shown in the solution. A digital signal to be channel-simulated is delayed in two different phases to generate propagation delay differences. The first delaying is done in section 190, where the signal is delayed by low resolution in accordance with each simulated path. The second delaying is done in section 192 by high resolution. In delay elements 200 to 210, the signal, which corresponds to the signal transmitted from the transmitter 100, is delayed discontinuously as multiples of a predefined delay unit. The delay unit can be the length of a sample of the digital signal or a multiple of the sample length. The low-resolution delay unit can be 12.5 ns, for instance, and the delays of the delay elements can then be as follows: the delay of delay element 200 is 8*12.5 ns=100 ns; the delay of delay element 202 is 16*12.5 ns=200 ns; the delay of delay element 204 is 24*12.5 ns=300 ns; the delay of delay element 206 is 33*12.5 ns=412.5 ns; the delay of delay element 208 is 41*12.5 ns=512.5 ns; and the delay of delay element 210 is 50*12.5 ns=625 ns. The signal components delayed by low resolution according to different paths can be weighted with a coefficient according to the fade occurring on different paths in multipliers 212 to 222, but weighting is not essential for delaying. In addition, differing from FIG. 2, weighting can also be done before the low-resolution delaying. In the present solution, a switch 224 switches the signals delayed by low resolution to such high-resolution delay elements 242 to 256 in the delay arrangement 192 that the path-specific delay formed in the simulation corresponds as well as possible to the desired delay of the path.

In the present solution, the switch 224 switches each signal component delayed by a low-resolution delay and weighted with a weighting coefficient corresponding to the fade to an adder 226 to 240. Each adder 226 to 240 is connected to only one high-resolution delay element 242 to 256 in the delay arrangement 192. The output signals of the high-resolution delay elements are summed in an adder 258, and its output signal simulates the multipath-propagated signal formed by signal components modified by different paths.

In FIG. 2, the number of high-resolution delay elements 242 to 256 is the ratio between the minimum delay of low-resolution delaying and the minimum delay of high-resolution delaying, but generally it is enough that the high-resolution delay is more precise than the low resolution delay. In this case, the ratio is 12.5 ns/1.56 ns=8. The delays of high-resolution delay elements 242 to 256 can for instance be as follows at an accuracy of two decimals: the delay of delay element 242 is 0 ns; the delay of delay element 244 is 1*12.5/8 ns=1.56 ns; the delay of delay element 246 is 2*12.5/8 ns=3.13 ns; the delay of delay element 248 is 3*12.5/8 ns=4.69 ns; the delay of delay element 250 is 4*12.5/8 ns=6.25 ns; the delay of delay element 252 is 5*12.5/8 ns=7.81 ns; the delay of delay element 254 is 6*12.5/8 ns=9.38 ns; and the delay of delay element 256 is 7*12.5/8 ns=10.94 ns. In the present example, the minimum delay (1.56 ns) of high-resolution delaying is the desired part of the minimum delay (12.5 ns) of the low-resolution delaying, which in this example is thus the eighth part, i.e. 12.5 ns/8=1.56 ns. In the low-resolution delay arrangement 190, the largest deviation of the delay from the desired delay can be equal to the minimum delay 12.5 ns, i.e. the delay has an imprecision of 12.5 ns, whereas in the high-resolution delay arrangement 192, the imprecision of the delay is 1.56 ns. Thus, in the low-resolution delay of the delay arrangement 190, the delay of a path may even be 12.5 ns smaller than the delay intended for the path. However, the high-resolution delay arrangement 192 adds the required delay by high precision. High-resolution delays may also contain a fixed delay component, because, in practice, a 0-ns delay is difficult to provide with a delay component. In such a case, the delay of delay element 242 cannot be 0 ns, but a delay value unequal to zero.

The switch 224 switches the signal components coming from multipliers 212 and 222 to adder 226 that sums the signal components and feeds the summed signal into delay element 242 that delays by high resolution. The switch 224 switches the signal component coming from multiplier 214 to adder 234 that receives no other signal components. From adder 234, the signal propagates to high-resolution delay element 250. The switch 224 switches the signal components coming from multipliers 216 and 220 to adder 238 that sums the signal components and feeds the summed signal into delay element 254 that delays by high resolution. The switch 224 switches the signal component coming from multiplier 218 to adder 236 that receives no other signal components. From adder 236, the signal propagates to high-resolution delay element 252. In this example, adders 228 to 232 and 240 and high-resolution delay elements 244 to 248 and 256 are not needed for forming the delays.

This way, the delay of the first path is the sum 100 ns of the delay 100 ns of low-resolution delay element 200 and the delay 0 ns of high-resolution delay element 242. The delay of the second path is the sum 206.25 ns of the delay 200 ns of low-resolution delay element 202 and the delay 6.25 ns of high-resolution delay element 250. The delay of the third path is the sum 309.38 ns of the delay 300 ns of low-resolution delay element 204 and the delay 9.38 ns of high-resolution delay element 254. The delay of the fourth path is the sum 420.31 ns of the delay 412.5 ns of low-resolution delay element 206 and the delay 7.81 ns of high-resolution delay element 252. The delay of the fifth path is the sum 521.88 ns of the delay 512.5 ns of low-resolution delay element 208 and the delay 9.38 ns of high-resolution delay element 254. The delay of the last path is the sum 625 ns of the delay 625 ns of low-resolution delay element 210 and the delay 0 ns of high-resolution delay element 242.

If the switch 224 switches the signal leaving each multiplier 212 to 222 to only one high-resolution delay element 242 to 256, the delays of the different paths differ from each other at least by the minimum delay (1.56 ns according to the example of FIG. 2) related to the high-resolution delaying. The accuracy of the delays can, however, be increased by switching each low-resolution signal component to more than one high-resolution delay element and by summing the signal components that traveled through the different high-resolution delay elements, whereby the delay is averaged. Signal components to be switched to different high-resolution delay elements can also be weighted in a different manner so as to form a weighted average. For instance, by switching the signal component of low-resolution delay element 202 to high-resolution delay elements 246 and 248 in such a manner that 20% of the signal component power enters delay element 246 and 80% enters delay element 248, the high-resolution delay is 0.2*3.125 ns+0.8*4.6875 ns=4.375 ns. This way, the total delay of the path is 200 ns+4.375 ns=204.375 ns.

In a linear interpolation, the forming of a high-resolution delay can be performed as weighted by combining the delays as follows:

$$d_{high-resolution} = \sum_{k=0}^{N-1} w_k d_k,$$

where $d_{high-resolution}$ is the high-resolution delay of each path that is summed to the low-resolution delay to form the desired total delay of the path, $w_k$ is a weighting coefficient (0 . . . 1) and $d_k$ is one of N predefined high-resolution delays. Weighting the signal components with the desired coefficients can be done in the switch 224.

If the frequency properties of the linear interpolation are not sufficient in an application, the division to high-resolution delays can be performed with an interpolation function, wherein the weighting coefficients $W_k$ can be selected from $(-\infty, \infty)$ in the above presentation.

Figure 3:
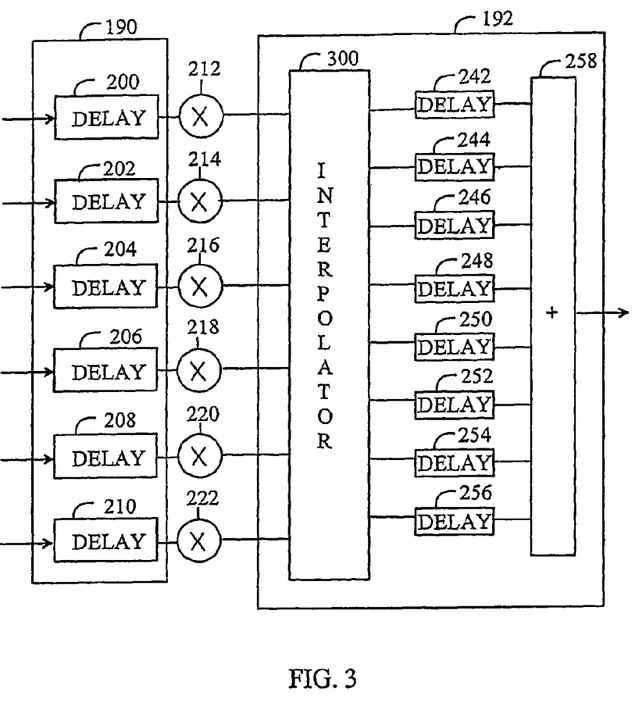
FIG. 3 shows an arrangement intended for forming a delay, which uses an interpolator.

FIG. 3 shows a solution, in which the switch 224 and adders 226 to 240 of FIG. 2 are replaced by an interpolator 300, while the rest of the parts remain the same. The interpolator 300 increases the sample frequency by a desired amount. When the sample frequency of signal components delayed by low resolution are octupled in the interpolator 300, and each signal component is directed to one or more high-resolution delay elements 242 to 256, the path-specific delays can be implemented as in the solution of FIG. 2.

Figure 4A:
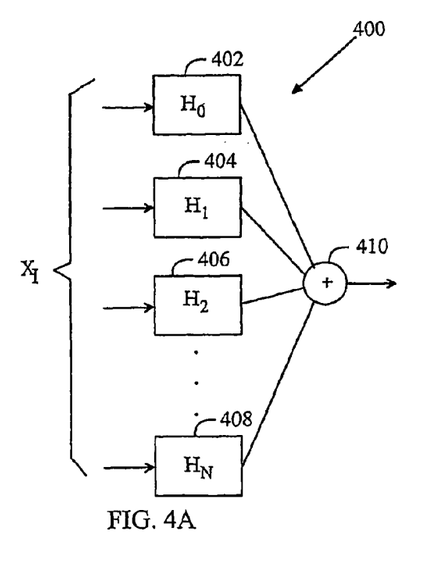
FIG. 4A shows a polyphase decimator.

The solution of FIG. 3 can be implemented using a polyphase decimator or a polyphase interpolator, in which case separate high-resolution delay elements 242 to 256 can be left out. FIG. 4A shows a polyphase decimator 400. The interpolator 300 signals $X_I$, N in all, are fed into the decimator 400. Each of the N signals propagates to a delay element 402 to 408 with a different transfer function for delaying and decimation. The decimator 400 selects at least one delayed and decimated signal component as an active output signal. Adder 410 in the decimator sums the signal components leaving one or more delay elements 402 to 408 and forms the same output signal as adder 258 in FIG. 3.

Figure 4B:
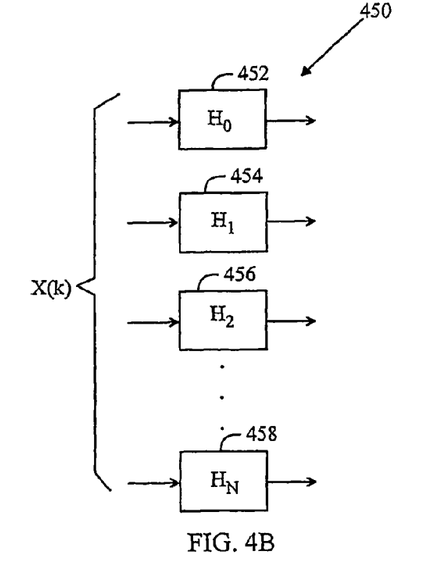
FIG. 4B shows a polyphase interpolator.

The polyphase interpolator 450 shown in FIG. 4B comprises several interpolating blocks. Interpolating block 452 increases the sample frequency of the input signal X(k) by a desired amount p without a delay so that the output signal is of the form X(pk). Interpolating block 454 increases the sample frequency of the input signal X(k) by a desired amount p and delays the signal by one sample of the increased sample frequency so that the output signal is of the form X(pk+1). Interpolating block 456 increases the sample frequency of the input signal X(k) by a desired amount p and delays the signal by two samples of the increased sample frequency so that the output signal is of the form X(pk+2). This principle is continued until the last block 458 that increases the sample frequency of the input signal X(k) by a desired amount p and delays the signal by (N−1) samples of the increased sample frequency so that the output signal is of the form X(pk+(N−1)), when there are N blocks 452 to 458. In a general case, there is an interpolator in the output of every multiplier that increases the sample frequency by N, wherein N can be 8, for instance.

Figure 5:
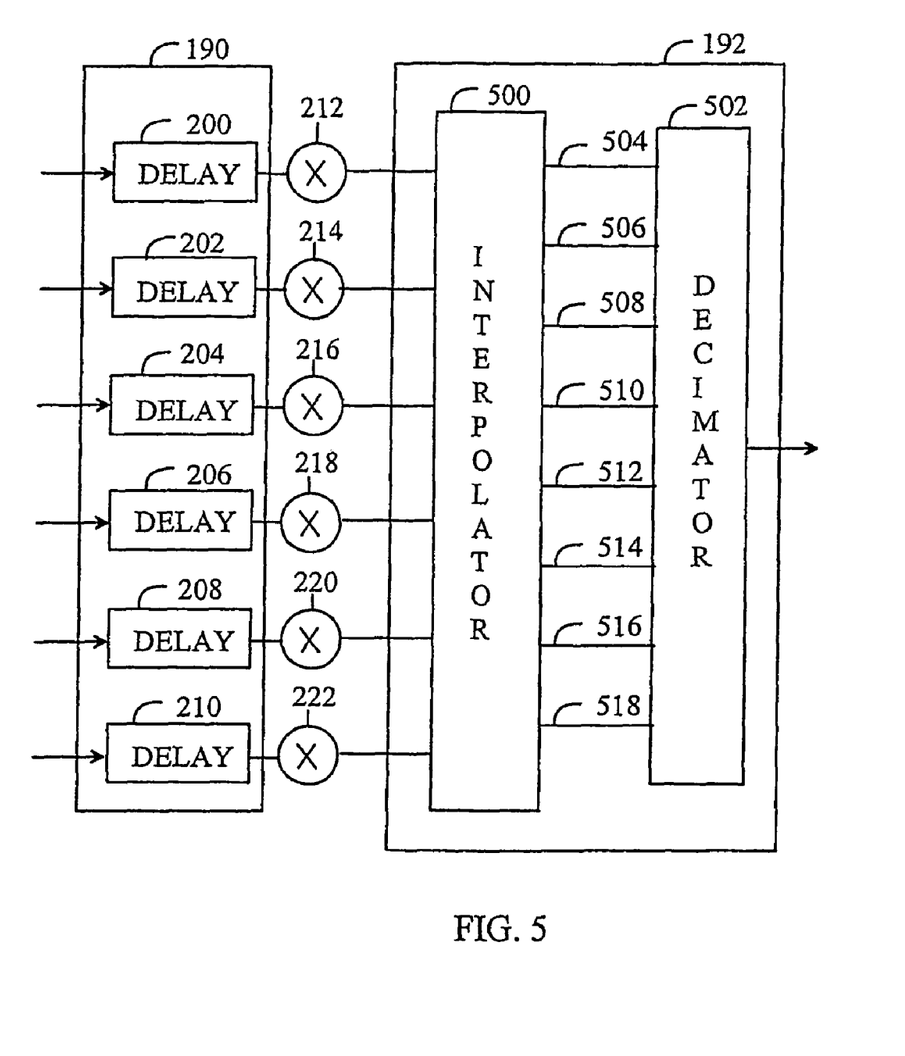
FIG. 5 shows an arrangement intended for forming a delay, which uses an interpolator and a decimator.

FIG. 5 shows an implementation, in which a polyphase interpolator 500 and decimator 502 implement the high-resolution delaying. The decimator 502 is not needed in its entirety, if high sampling frequency is to be used, but the combination of the signal components must, however, be done. The signal components delayed by low resolution in delay elements 200 to 210 and possibly weighted by a complex weighting coefficient corresponding to the fade in multipliers 212 to 222 are fed into the interpolator 500 that increases the sample frequency by a desired amount (as shown in FIG. 2, the sample frequency can be increased eightfold, for instance). In addition, each signal fed into the interpolator 500 is phased in a different manner in output lines 504 to 518, as described in FIG. 4, which generates a high-resolution delay. Because the signal component of each path is delayed by a different low-resolution delay in delay elements 200 to 210, the signal components of different paths arrive at different times at the interpolator 500 and are, thus, also at the output of the interpolator 500 at different times.

In one embodiment of the present solution, the interpolator 500 selects at each time instant (i.e. for each output sample) at least one of its output lines 504 to 518 as the active output line. The interpolator 500 can select only one active output line, while the other lines remain inactive. A signal component delayed by a low-resolution delay is then delayed in the interpolator 500 by one high-resolution delay when proceeding to the one active output line of the interpolator 500. The decimator 502 decimates and combines into one output signal the received signal component. Decimation can be performed on any sample frequency lower than the interpolated frequency, but usually decimation restores the sample frequency used prior to interpolation.

The interpolator 500 may also select more than one active output lines 504 to 518, in which case the high-resolution delay is formed as in the case of FIG. 2, in which one signal component delayed by a low-resolution delay is switched to several high-resolution delay elements. The high-resolution delay is thus formed as a weighted average of the delays of the different output lines 504 to 518.

Instead of the interpolator 500 selecting the delay lines 504, the decimator 502 can select one or more of the output lines of the interpolator 500, from which the decimator 502 receives a signal. Then all the output lines of the interpolator 500 can always be active, but the desired high-resolution delay is formed on the basis of the selections made by the decimator 502.

Figure 6:
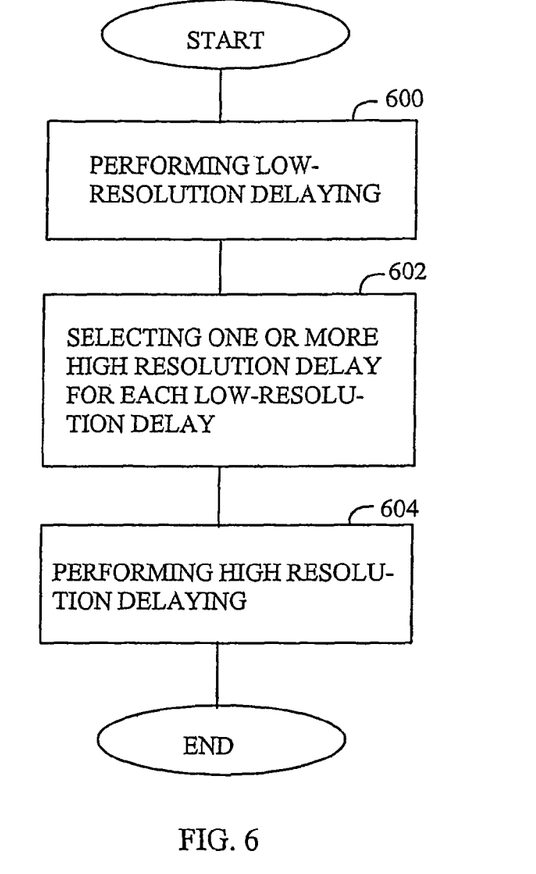
FIG. 6 is a flow chart of the method.

Let us yet take a look at the flow chart of the present method in FIG. 6. In step 600, high-resolution delaying is performed on each path. In this step, it is also possible to fade the signals of different paths in a desired manner. In step 602, one or more high-resolution delays is selected for the signal component of each path, and in step 604, the selected high-resolution delaying is performed so as to achieve a desired total delay for each path.

Figure 7:
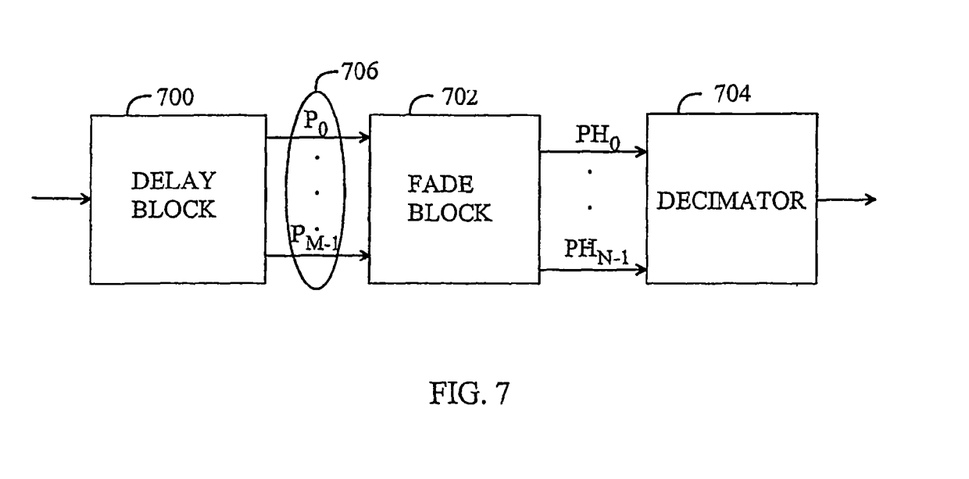
FIG. 7 shows a channel simulator that applies interpolation and decimation.

FIG. 7 shows a block diagram of a channel simulator according to one implementation. A signal fed into a low-resolution delay arrangement 700 is delayed in a manner corresponding to each path 706. There may be M paths, wherein M is positive integer. A high-resolution delay is formed by interpolation for the signal of each path in a fade block 702. Due to different high-resolution delays, there are N output signals having a different phase in the fade block 702, wherein N is a positive integer that is often unequal to M. In the fade block 702, the signals of different paths can also be amplified in different ways. In a decimator 704, the high-resolution signals are selected that produce as the simulated delay of each path the sum of the low-resolution and high-resolution delays, which corresponds to the desired delay of each path. In addition, the decimator 704 decimates the signals to the original sample frequency.

Even though the invention has been explained in the above with reference to examples in accordance with the accompanying drawings, it is apparent that the invention is not restricted to them but can be modified in many ways within the scope of the inventive idea disclosed in the attached claims.

What is claimed is:

1. A method for testing a radio-frequency device, the method comprising:
   simulating a radio channel having a plurality of paths, at least two of the paths being simulated in parallel, the simulation being configured to form the delay of each of the plurality of paths separately with at least one low-resolution delay and at least one high-resolution delay in such a manner that the simulated delay of each of the plurality of paths is the sum of the at least one low-resolution delay and the at least one high-resolution delay;
   performing low-resolution delaying on the plurality of paths discontinuously as multiples of a predefined minimum delay, and performing high-resolution delaying more precisely than the low-resolution delaying;
   selecting for at least one test signal delayed by the at least one low-resolution delay at least one fixed, high-resolution delay which is a predefined part of the predefined minimum delay of the at least one low-resolution delay, the at least one test signal being a clean signal without multipath propagation delays;
   delaying the at least one test signal delayed by the at least one low-resolution delay by the at least one selected high-resolution delay; and
   summing at least two delayed test signals to form a simulated multipath-propagated testing signal of a simulated radio channel, thereby generating the testing signal with simulated multipath-propagated delays to simulate actual conditions.

2. A method as claimed in claim 1, the method further comprising delaying, in high-resolution delaying, by interpolating the at least one test signal delayed by the at least one low-resolution delay in several phases, and selecting at least one phase of the polyphase interpolation as the at least one high-resolution delay.

3. A method as claimed in claim 2, the method further comprising decimating the high-resolution delayed signal to an original sample frequency.

4. A method as claimed in claim 1, the method further comprising selecting for the at least one test signal delayed by the at least one low-resolution delay several high-resolution delays, as a function of which the at least one high-resolution delay is formed.

5. A method as claimed in claim 4, the method further comprising forming the at least one high-resolution delay as a weighted average.

6. A method as claimed in claim 1, the method further comprising selecting for at least one test signal delayed by the at least one low-resolution delay at least one predefined high-resolution delay by switching the at least one test signal delayed by the at least one low-resolution delay to at least one high-resolution delay circuit.

7. A method as claimed in claim 1, the method further comprising interpolating at least one low-resolution delayed test signal, and selecting for the at least one test signal delayed by a low-resolution delay at least one predefined high-resolution delay by switching the at least one test signal delayed by the low-resolution delay to at least one high-resolution delay circuit.

8. A method as claimed in claim 1, the method further comprising performing high-resolution delaying as a multiple of a predefined minimum delay that is shorter than the predefined minimum delay of the high-resolution delaying.

9. A method as claimed in claim 1, the method further comprising weighting the at least one test signal delayed by a low-resolution delay by a coefficient that corresponds to the path-specific fade.

10. An arrangement for testing a radio frequency device, which arrangement is arranged to simulate a radio channel having a plurality of paths, at least two of the paths being simulated in parallel, the arrangement being configured to form the delay of each of the plurality of paths separately with at least one low-resolution delay and at least one high-resolution delay in such a manner that the simulated delay of each of the plurality of paths is the sum of the at least one low-resolution delay and the at least one high-resolution delay, the arrangement comprising:
    at least one low-resolution delay unit on each of the plurality of paths, the at least one low-resolution delay unit performing low-resolution delaying on the plurality of paths discontinuously as multiples of a predefined minimum delay;
    a high-resolution delay arrangement performing the delaying more precisely than the low-resolution delaying, wherein the high-resolution delay arrangement is arranged to provide at least one fixed, high-resolution delay which is a predefined part of the predefined minimum delay of the at least one low-resolution delay, and the high-resolution delay arrangement is arranged to select for at least one test signal delayed by the at least one low-resolution delay at least one predefined high-resolution delay, the at least one test signal being a clean signal without multipath propagation delays; and a summing arrangement to sum the at least one delayed test signal to form a simulated multipath-propagated testing signal of a simulated radio channel, thereby generating the testing signal with simulated multipath-propagated delays to simulate actual conditions.

11. An arrangement as claimed in claim 10, wherein the high-resolution delay arrangement is arranged to interpolate the signal delayed by the at least one low-resolution delay in several phases, and to select at least one phase of the polyphase interpolation as the at least one high-resolution delay.

12. An arrangement as claimed in claim 11, wherein the arrangement comprises a decimator for decimating the high-resolution delayed signal to an original sample frequency.

13. An arrangement as claimed in claim 10, wherein the high-resolution delay arrangement is arranged to select for the at least one test signal delayed by the at least one low-resolution delay several high-resolution delays, as a function of which the high-resolution delay is formed.

14. An arrangement as claimed in claim 13, wherein the high-resolution delay arrangement is arranged to form the at least one high-resolution delay as a weighted average.

15. An arrangement as claimed in claim 10, wherein the high-resolution delay arrangement comprises a switch for selecting for the at least one test signal delayed by the at least one low-resolution delay at least one predefined high-resolution delay by switching the at least one test signal delayed by the at least one low-resolution delay to at least one high-resolution delay circuit.

16. An arrangement as claimed in claim 10, wherein the high-resolution delay arrangement comprises an interpolator for interpolating the at least one low-resolution delayed test signal, and the high-resolution delay arrangement is arranged to select for the at least one test signal delayed by the at least one low-resolution delay at least one predefined high-resolution delay by switching the at least one test signal delayed by the at least one low-resolution delay to at least one high-resolution delay circuit.

17. An arrangement as claimed in claim 10, wherein the high-resolution delay arrangement is arranged to perform high-resolution delaying as a multiple of a predefined minimum delay that is shorter than the predefined minimum delay of high-resolution delaying.

18. An arrangement as claimed in claim 10, wherein the arrangement is arranged to weight at least one signal delayed by the at least one high-resolution delay by a coefficient corresponding to the path-specific fade.

\* \* \* \* \*